C. A. JONES.
FILTER FOR PIPES AND THE LIKE.
APPLICATION FILED JUNE 30, 1910.
1,127,771.
Patented Feb. 9, 1915.
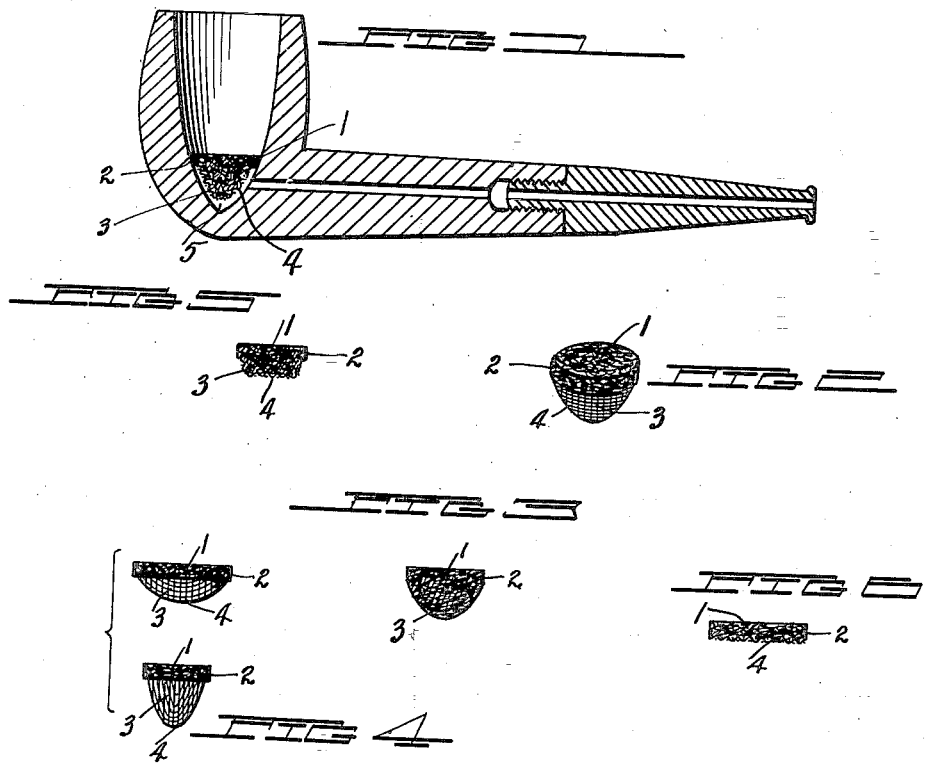
Witnesses
Robert Plow
[signature]
Inventor
Clarence A. Jones
By [signature]
Atty

UNITED STATES PATENT OFFICE.

CLARENCE A. JONES, OF WENONA, ILLINOIS, ASSIGNOR TO FILTERETTE COMPANY, OF WENONA, ILLINOIS.

FILTER FOR PIPES AND THE LIKE.

1,127,771.

Specification of Letters Patent.

Patented Feb. 9, 1915.

Application filed June 30, 1910. Serial No. 569,800.

*To all whom it may concern:*

Be it known that I, CLARENCE A. JONES, a citizen of the United States, residing at Wenona, in the county of Marshall and State of Illinois, have invented certain new and useful Improvements in Filters for Pipes and the like, of which the following is a specification.

This invention has reference to filters for pipes and the like and has for its object to provide an article of this kind made preferably of metal-wool or other porous material; said filter shaped so as to have an annular engaging face and a reduced body portion.

The invention has for a further object to provide a filter, composed of a mass of metal-wool pressed into suitable shape and supported by a wire-screen or other foraminous sheet, the metal-wool previous to its being shaped into the filtering article being annealed so as to soften the material and thereby make it not only easy to mold but retain its form when pressed into shape.

That the invention may be more fully understood, reference is had to the accompanying drawings, in which:—

Figure 1 is a vertical sectional view of a pipe with my improved filter in position in the bowl of the pipe; Fig. 2 is a perspective view of the filter; Fig. 3 is a cross-section of the filter, the wire-screen being omitted; Fig. 4 shows a side elevation of two different forms into which the filter may be compressed; Fig. 5 is a cross-section of a filter showing a different shape of the lower body portion, and Fig. 6 is a cross-tion of a further and different form of filter body.

Like numerals designate corresponding parts throughout the figures.

The filter is composed of a mass of metal-wool 1 which may be pressed into any suitable shape, such for instance as shown in any of the figures, but I prefer to press the mass into the shape shown in Fig. 2 so as to provide the annular engaging face 2 and the lower reduced body portion 3, conical in shape. That is to say, the body portion 3 of the filter is supported by a head portion a little larger in diameter than the body portion 3 which has the peripheral engaging face 2. It is necessary that the filter have some shape, but being pliable, whatever its preliminary shape or form may be, if such shape does not conform to the bowl into which it is to be deposited, a little pressing will make it conform to the interior of the bowl. A wire-screen 4 or other foraminous sheet covers and supports the lower body portion 3 of the filter, said screen fitting the lower portion of the filter in such a way that the engaging face 2 of the filter will not be interfered with in its engagement with the wall of the bowl, and through such engagement cling to the inner surface of the bowl.

While I prefer metal-wool from which to construct, mold or shape the filtering article, I am aware that the filter may be made of various other material, such as shreaded-wood, asbestos, non-inflammable cloth or woven-wire, but I do not believe with as good results as when made of metal-wool.

I have discovered that to use metal-wool and get the best results, the mass should be properly annealed to relieve the material of its springiness and make it not only soft and pliable to work, but so that it will hold its form when shaped and not spring apart; so I wish to cover not only as an article of manufacture, a filter composed of metal-wool, but the annealing of the mass prior to shaping whereby the results aimed at may be accomplished.

The filter when inserted into a bowl will be immovably held through the impinging relation and engagement of the peripheral face of the portion 2 and the wall of the bowl, the lower portion 3 depending into the bottom of the bowl, but preferably not engaging the same, leaving an air chamber 5 for the circulation of air, causing the pipe to smoke cooler and also allowing a more even draft through the filter. While I have stated that the filter is immovable in the bowl, it is understood that it has only a temporary fixed relation because of its impinging relation with the bowl, and that it is capable of being easily removed and in fact has only a temporary existence and must be replaced after a stated interval. I wish it understood that the filter is not a part of the pipe but a separate article to be inserted into and capable of being removed intact from the pipe, and is intended for use in the various makes of pipes. Filling as it does the lower bowl portion of the pipe it saves to the smoker that portion of the tobacco which would otherwise be lost, because of becoming damp. I have found from experience that with the use of my filter there is a great saving in tobacco and all that is left is the small amount of ash.

What I claim is:—

A filter button for tobacco pipes comprising a mass of metal wool pressed to provide an annular portion and a lower body portion, said annular portion being of greater diameter than said lower body portion and arranged to engage the lower inner face of the bowl of a tobacco pipe, and a wire screen covering said lower body portion, the whole being adapted to be supported by the engagement of said annular portion with the inner face of the bowl so that it is free and above the floor of the bowl chamber.

In testimony whereof I affix my signature, in presence of two witnesses.

CLARENCE A. JONES.

Witnesses:
WM. BASSETT,
WALTER V. HOWE.